M. B. BENSON.
PROPELLING AND BRAKING MEANS FOR TRAVELING CRANES AND CARRIAGES.
APPLICATION FILED JULY 25, 1919.
1,366,352. Patented Jan. 25, 1921.
2 SHEETS—SHEET 1.
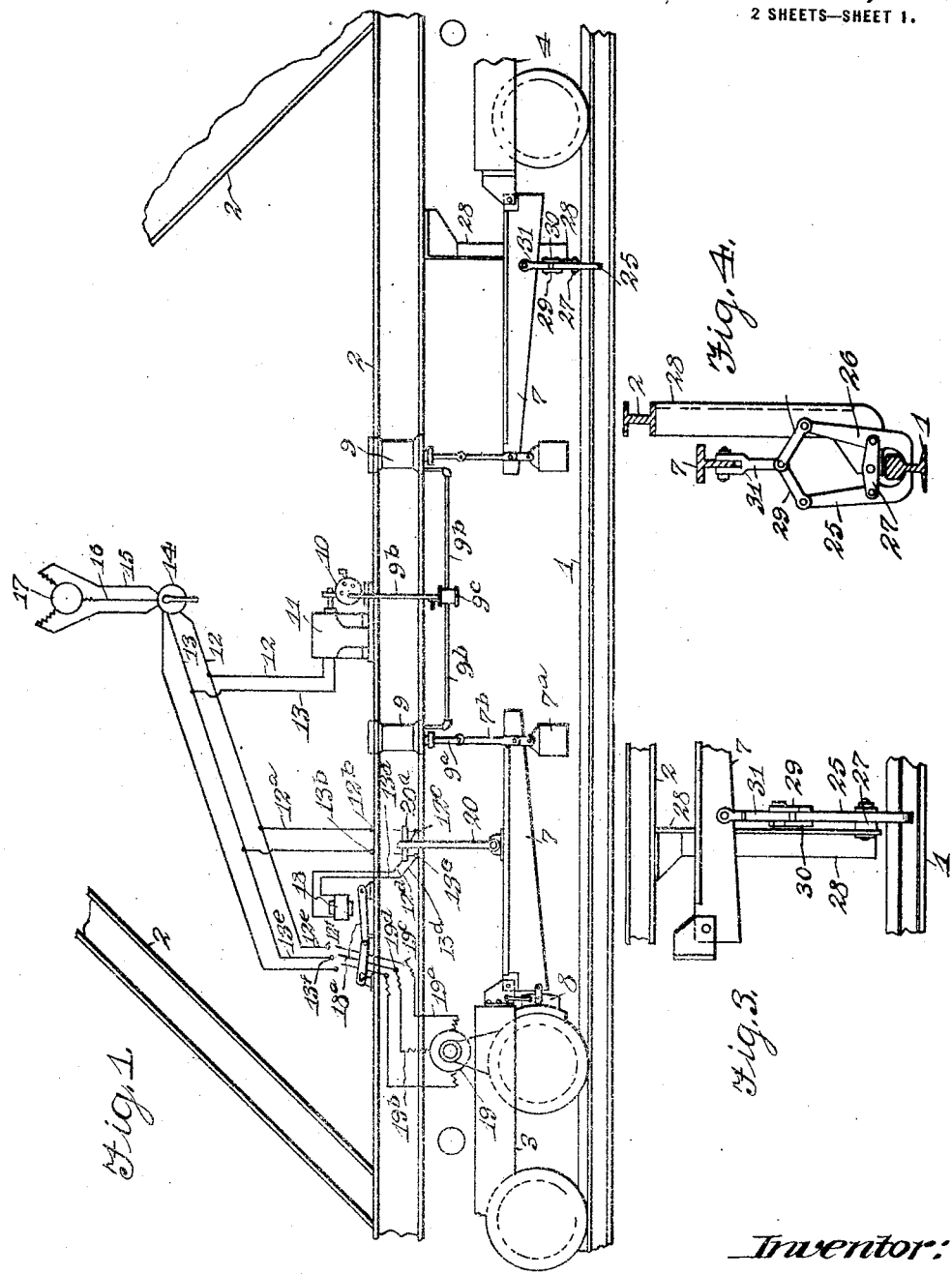

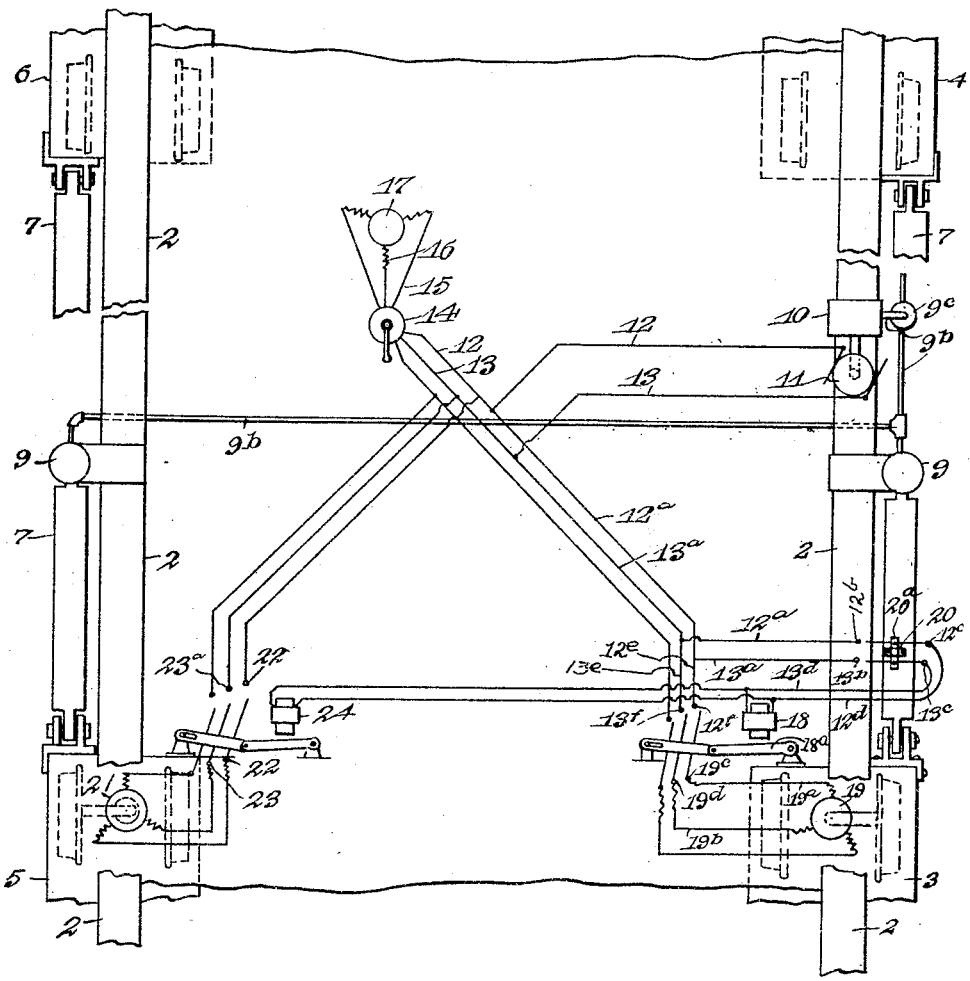

UNITED STATES PATENT OFFICE.

MELVIN B. BENSON, OF SUPERIOR, WISCONSIN.

PROPELLING AND BRAKING MEANS FOR TRAVELING CRANES AND CARRIAGES.

1,366,352.   Specification of Letters Patent.   Patented Jan. 25, 1921.

Original application filed October 23, 1918, Serial No. 260,039. Divided and this application filed July 25, 1919. Serial No. 313,306.

*To all whom it may concern:*

Be it known that I, MELVIN B. BENSON, a citizen of the United States, residing at Superior, in the county of Douglas and State of Wisconsin, have invented certain new and useful Improvements in Propelling and Braking Means for Traveling Cranes and Carriages, of which I do hereby declare the following to be a specification.

My invention relates to propelling and braking means for traveling cranes and carriages, and has for its object the provision of simple and effective means for starting and stopping the movement of traveling cranes or carriages upon their tracks, or roadways. It consists of the electric circuits, constructions, combinations and arrangements of parts hereinafter described and claimed.

Certain claims forming part of the present application were originally included in my application for United States Letters Patent for propelling and braking mechanism for traveling cranes and carriages, filed in the office of the Commissioner of Patents on October 28th, 1918, and numbered Serial Number 260,039, from which they were eliminated in compliance with a requirement by the Examiner for division.

In the drawings, Figure 1 is a fragmentary side elevation of a traveling crane, partly broken away and partly in diagram, equipped with my said invention. Fig. 2 is a diagrammatic plan view of means embodying my said invention. Fig. 3 is a side elevation of a modified form of brake shoe within the scope of certain of my claims, and Fig. 4 is an end view of said modified form.

In the drawings, 1 is a railway track; 2 is the frame of a crane, partly broken away; 3, 4, 5 and 6 are trucks positioned on said tracks and upon which said frame is mounted. Said trucks and frame may be of any suitable structure. Pivotally secured near one of its ends to said frame or one of said trucks is a brake lever 7, the opposite end of which is weighted in any suitable manner, as by a weight $7^a$ suspended therefrom. At the pivoted end of said lever, a brake shoe 8 is secured thereto in any suitable manner, which shoe is adapted in operative position, as when the weighted end of said lever is in lowered position, to bear against one of the wheels of one of said trucks to prevent said wheel from turning. Connected to said lever at any suitable point is a link or connecting rod $7^b$, one end of which is connected to a piston rod $9^a$ extending from an air or brake cylinder 9. The chamber in said cylinder below the piston therein (not shown) communicates in any suitable manner or by any suitable means as by a pipe $9^b$ with the pressure chamber of an air compressor 10 of any suitable structure, which air compressor is operated by an electric motor 11. A safety valve $9^c$ is provided to limit the air pressure in pipe $9^b$. Said motor is included in an electric circuit comprising said motor, the wire 12 and 13, controller 14, wires 15 and 16, and a generator 17, which generator may be carried by said frame, or be distant therefrom. Said wires 12 and 13 are tapped by the wires $12^a$ and $13^a$ which are connected to normally open contacts $12^b$ and $13^b$ of an electric cut out switch or circuit closer. Adjacent to said contacts but insulated therefrom and from each other are contacts $12^c$ and $13^c$, which contacts $12^c$ and $13^c$ are in circuit through suitable connecting wires $12^d$ and $13^d$ with an electromagnet 18. Said contacts $12^c$ and $13^c$ are adapted to be brought into electric communication with the contacts $12^b$ and $13^b$ respectively by a contact closer of any suitable construction adapted to be mechanically operated by the hereinafter described brake-beam, as will appear. Said wires $12^a$ and $13^a$ are tapped by wires $12^e$ and $13^e$ respectively which are connected to normally open contacts $12^f$ and $13^f$ adjacent to said magnet 18. 19 is an electric propelling motor of any suitable structure, which is geared to one of said trucks. The poles of said motor 19 are connected by wires $19^a$ and $19^b$ with normally open contacts $19^c$ and $19^d$ adjacent to said contacts $12^f$ and $13^f$, and are adapted to be brought into electric communication with said contacts $12^f$ and $13^f$ by a circuit closer of any suitable structure adapted to be operated by said magnet 18. Connected at one end to said brake-beam intermediate of the ends thereof, is a link 20, which link is connected at its opposite end to a circuit closer $20^a$ which is adapted to be operated by said link, when said beam is in its operative or raised position, to establish electric communication between the contacts 12$^b$ and 12$^c$ and between the contacts 13$^b$ and 13$^c$.

In operation, the current from the generator being turned on at the controller, said current first passes through the compressor motor 11 which motor operates the compressor 10, the air pressure passing to the cylinder 9 and raising the piston therein, thus drawing up the free end of the brake-beam and releasing the brake. The rising brake-beam by means of the link 20 and attached circuit closer, closes the circuit between contacts 12$^b$ and 12$^c$ and between 13$^b$ and 13$^c$, whereupon part of the current flows through the magnet 18, which operates the adjacent circuit closer 18$^a$ to close the circuit through contacts 12$^f$ and 19$^c$ and through contacts 13$^f$ and 19$^d$, whereupon part of the current flows through the wires 12$^e$ and 13$^e$ and 19$^a$ and 19$^b$ and propelling motor 19. The motor 11 continues to operate the compressor to furnish air for maintaining the brake-beam in its brake-retracting circuit-closing raised position. Upon the current being cut off at the controller, said motor 11 stops and the air leaks from the cylinder 9 permitting the weight 7$^a$ to draw the brake-beam down, thus applying the brake, and at the same time retracting the circuit closer between contacts 12$^b$ and 12$^c$ and between 13$^b$ and 13$^c$. The magnet 18 drops the circuit closer governed thereby, thus opening the circuit between said controller and motor 19 and preventing any flow of current to said motor 19 until said brake-beam shall have been raised again and the brake released.

If the trucks on transversely opposite sides of the vehicle are very far apart and propelling power is applied to only one of them, the other may have a tendency to lag, thus producing torsional strains in the frame. To avoid this I prefer in such case to provide a propelling motor for the transversely opposite truck, as the motor 21, the poles of which may be tapped on to said wires 19$^a$ and 19$^b$, or, if desired, may instead terminate in the normally open contacts 22, 23 opposed to normally open contacts 22$^a$, 23$^a$ respectively which latter contacts may be connected by tap wires with said wires 12 and 13. In the latter case said wires 12$^d$ and 13$^d$ may be tapped to provide a current for an electric magnet 24 adapted to operate a circuit closer to close the circuit between contacts 22 and 22$^a$, and 23 and 23$^a$. Thus the propelling motors 19 and 21 at transversely opposite sides of the vehicle will start or stop simultaneously. In similar case, a brake-beam, weight, shoe and brake cylinder for retracting or lifting said beam may be provided at the transversely opposite side of said vehicle from the first referred to beam; said second brake cylinder being connected in any suitable manner with said air compressor, or with a similar air compressor. In like manner brake mechanism may be provided to individually govern the trucks at the opposite ends of the vehicle. If desired, the shaft of the motor 19 may be extended across the vehicle and geared to the opposite truck as well as to the one adjacent to said motor 19, in which case the motor 21 may be omitted.

In Fig. 3 is shown a modified form of brake shoe adapted to engage the track rail instead of the truck wheel. In said modified form, said shoe comprises jaws 25 and 26 connected together near their lower ends by a tie-bar 27 pivoted thereto at its ends, which bar is pivotally secured intermediate of its ends to the lower end of a post 28 depending from said frame 2. The upper ends of said jaws are connected together by toggle bars 29 and 30 pivoted thereto at their outward ends and pivotally connected at their inner ends to the lower end of a link 31, the upper end of which link is pivotally secured to said brake-beam at any suitable point. Where said brake beam is in lowered position said jaws are adapted to straddle and grip one of the rails of said track. Upon the lifting of said beam said toggle bars draw the upper ends of said jaws together thus spreading the lower ends thereof and freeing them from said rail.

While I have described certain tap wires between the controller and certain translation devices, it is obvious that other wire arrangements may be made with equivalent electrical effect. It is also obvious that said construction may be modified in various details within the spirit and scope of certain of my claims.

What I claim is—

1. The combination with a vehicle, of an electric motor adapted to propel the same, a source of electricity, means for conducting electric current from said source to said motor, said means including a normally open contact and a contact closer, an electromagnet for operating said contact closer, means for conducting current from said source to said electromagnet, said latter means including a normally open contact and a contact closer, gravity operated means adapted in operation to retract said second contact closer from operative position, and means including an air compressor for retracting said gravity operated means, said gravity operated means being adapted in retracted position to thrust said second contact closer into operative position.

2. The combination with a vehicle of an electric motor adapted to propel the same, a source of electricity, means for conducting current from said source to said motor, said conducting means including a normally open contact and a contact closer, means including a gravity operated member adapted when said gravity operated member is in lowered position to prevent the operation of said contact closer, said latter means being adapted when said gravity operated member is in raised or retracted position to prevent the retraction of said contact closer, and means for retracting said gravity operated member, said retracting means being adapted when released to operate as a yielding brake or drag upon said gravity operated member during its movement from retracted to operative position.

In testimony whereof, I hereunto affix my signature, in presence of two witnesses.

MELVIN B. BENSON.

Witnesses:
   THOMAS J. JOYCE,
   E. E. RINGDAHL.